United States Patent [19]
Durling

[11] 3,900,230
[45] Aug. 19, 1975

[54] PNEUMATIC BRAKE SYSTEM INCORPORATING A DOUBLE CHECK VALVE

[75] Inventor: Harold Durling, Elsie, Mich.

[73] Assignee: Midland-Ross Corporation, Cleveland, Ohio

[22] Filed: May 13, 1974

[21] Appl. No.: 469,088

[52] U.S. Cl. ........................... 303/84 A; 137/533.11
[51] Int. Cl. ............................................. B60t 17/22
[58] Field of Search..... 137/516.27, 516.29, 533.11, 137/11 L; 303/7, 40, 41, 84 A, 84 R; 188/151 A

[56] References Cited
UNITED STATES PATENTS

| | | | |
|---|---|---|---|
| 2,105,748 | 1/1938 | McCarty | 303/84 A |
| 2,300,694 | 11/1942 | Overbeke | 137/516.27 X |
| 3,444,881 | 5/1969 | Harper | 137/533.11 X |
| 3,447,556 | 6/1969 | Howeth | 137/533.11 X |
| 3,498,315 | 3/1970 | Graves et al. | 137/533.11 X |

FOREIGN PATENTS OR APPLICATIONS

| | | | |
|---|---|---|---|
| 668,773 | 8/1963 | Canada | 303/84 A |

*Primary Examiner*—Duane A. Reger
*Attorney, Agent, or Firm*—Frank J. Nawalanic

[57] ABSTRACT

A pneumatic brake system for a tractor-trailer vehicle incorporates a double check valve within the tractor brake system which functions to quickly port air to the trailer brake system to improve brake response of the vehicle. The double check valve incorporates a cage member suspended within a bore in the valve housing in combination with a spring biased detent mechanism arranged in such a manner to dampen oscillations of a ball valve member within the cage member thereby permitting air to flow unimpeded through the check valve.

8 Claims, 1 Drawing Figure

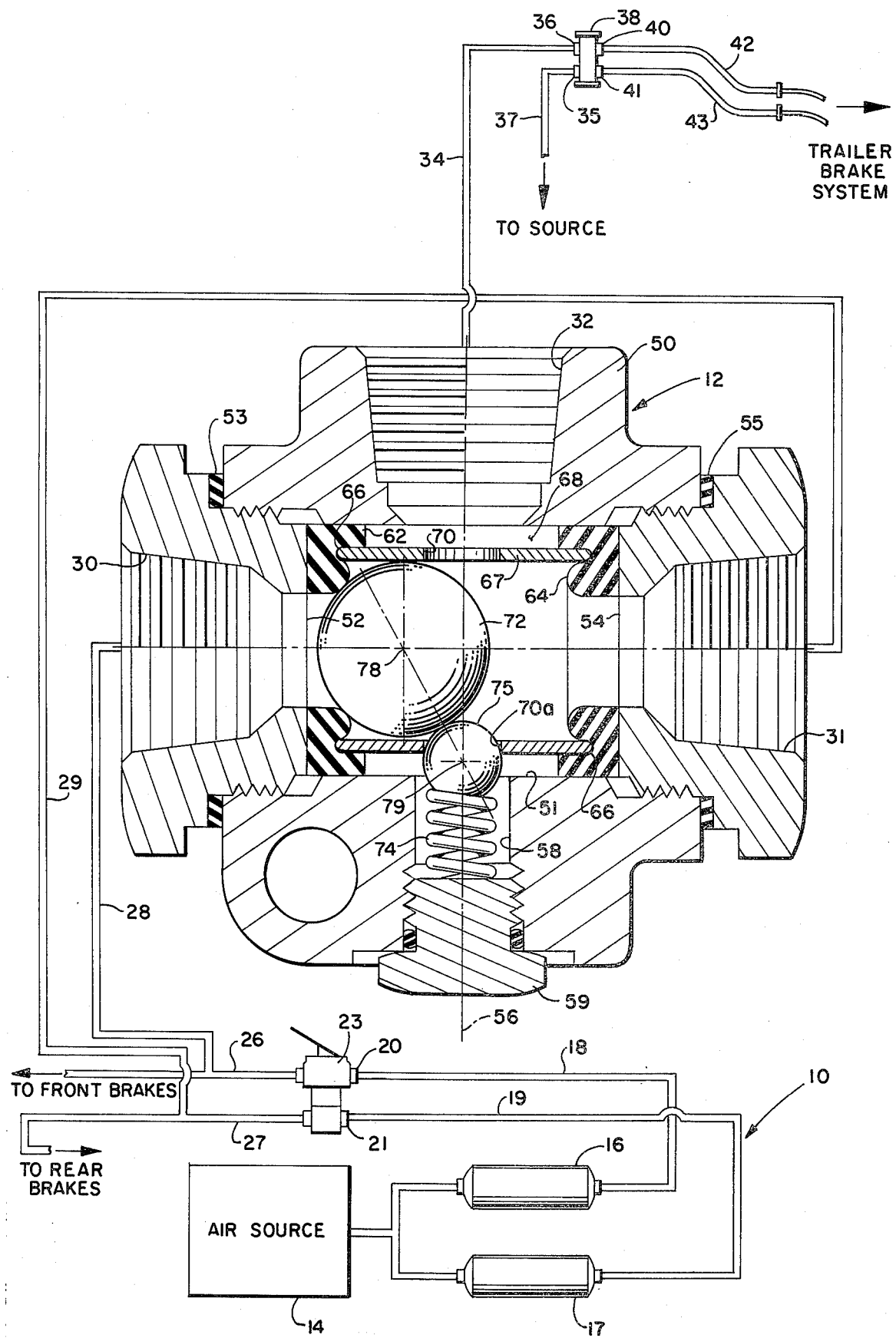

PNEUMATIC BRAKE SYSTEM INCORPORATING A DOUBLE CHECK VALVE

This invention relates generally to an improved tractor-trailer pneumatic brake system and, more particularly, to a double check valve incorporated within the system to improve the function thereof.

The invention is particularly applicable to a tractor-trailer vehicle brake system employing a dual or split type tractor brake system wherein the front and rear brakes of the tractor are actuated by separate air reservoirs and will be described with particular reference thereto. However, it will be appreciated by those skilled in the art that the invention has broader applications and may be applied in any pneumatic system utilizing a double check valve which requires air to be ported therethrough in an unimpeded manner.

Most tractor-trailer brake systems operate to port source air at supply and signal pressures to trailer brake systems, generally, by means of a tractor protector valve interposed between the tractor and trailer brake systems. The tractor protector valve automatically cycles to prevent fluid communication between the tractor brake system and trailer brake system upon a failure in the trailer brake system. When a conventional treadle valve is employed in the tractor brake system, it is a simple matter to incorporate the tractor protector valve within the tractor brake system. This is typically accomplished by a line "T'd" to the treadle valve outlet and in fluid communication with the signal line inlet of the tractor protector valve and a second line leading from the supply line inlet of the tractor protector valve essentially in fluid communication with the air source at supply pressure.

Recently, safety regulations, particularly those governing tractor-trailers to be built after Jan. 1975, have resulted in the conventional treadle valve being modified to supply separate sources of air at signal pressure to the front and rear brakes of the tractor so that the tractor could be braked in the event of a brake failure at either the front or rear axles thereof. To meet this requirement, treadle valves have been modified to employ two separate outlets, each outlet porting signal line pressure to either front or rear tractor brakes. Both outlets may also be in fluid communication with the signal line inlet of the tractor protector valve so that the trailer brakes may still function if a failure occurred in either the front or rear axle brake systems of the tractor. Several arrangements have been used to provide signal line pressure connections from the treadle valve to the tractor protector valve.

The most common arrangement in use is to provide a double check valve with its inlets connected to the signal line outlets of the treadle valve and its outlet connected to the signal line inlet of the tractor protector valve. The double check valves heretofore employed have been of the type which utilize a shuttle piston, extremely sensitive to pressure differentials, to close the inlet at lowest pressure thereby providing fluid communication between the open inlet and the outlet. In such arrangements, it has been found that the shuttle piston of the check valve undergoes rapid oscillation during normal braking of the tractor vehicle which impedes or hinders the passage of air at signal pressure to the trailer brake system.

It is thus an object of the subject invention to provide in a tractor-trailer brake system of the type described above a check valve which ports air at signal pressure to the tractor protector valve in an improved manner effective to make the trailer brake system more responsive to the tractor brake system.

This object along with other features of the subject invention is achieved in a tractor-trailer system of the above described type employing a double check valve therein. The double check valve is defined by a housing having a central bore axially extending therethrough with the valve's first inlet at one end of the bore and the valve's second inlet at the opposite bore end. The housing is also provided with an outlet perpendicular to and in fluid communication with the bore. Aligned with the outlet is a blind passage in the housing also opening to the bore. Circular valve seats are disposed at each end of the bore and are effective to suspend a longitudinally extending cage member within the bore. The cage member is provided with a plurality of openings in a circumferentially spaced array, axially aligned with the blind passage and the outlet to permit rapid flow of the ported air through the cage member to the outlet. A spherical ball valve element is disposed within the cage member and a spring biased ball detent mechanism extends partially through one of the cage member openings in alignment with the blind passage to contact the sphere at a predetermined minimum contact force sufficient to prevent excessive vibrations or oscillations of the sphere during normal brake applications. The sizing of the cage member, spherical valve element, spherical detent ball, and the position of the detent ball with respect to the spherical valve element are such to provide, in effect, the greatest resistance force against initial movement of the spherical valve element to assure a positive on-off actuation of the sphere element.

It is thus another object of the subject invention to provide a check valve which ports air therethrough in an unimpeded manner when one of its inlets is closed.

It is yet another object of the subject invention to provide a simple, easily constructed and positively actuated double check valve.

The invention may take physical form in certain parts and arrangement of parts, a preferred embodiment of which will be described in detail herein and illustrated in the accompanying drawing which forms a part hereof and wherein:

The drawing shown illustrates a sectional view of the double check valve employed in a tractor-trailer brake system schematically illustrated.

Referring now to the drawing wherein the showings are for the purpose of illustrating a preferred embodiment of the invention only and not for the purpose of limiting same, there is schematically illustrated a portion of a tractor-trailer brake system indicated generally at 10 which includes a double check valve 12 as a part thereof. Brake system 10 illustrated comprises only that portion of the entire vehicle brake system necessary for a detailed explanation of the operating characteristics of double check valve 12 and certain brake system components have not been shown nor described in detail herein as same are believed known to those skilled in the art.

The portion of the brake system 10 illustrated includes a source of air 14 generally including a compressor driven by the tractor engine to supply air at a given pressure, controlled by a governor, into a supply reservoir which maintains the air therein at "supply" or "emergency" pressure for brake system purposes associated with such terms as known in the art; all of the aforementioned components known to those skilled in the art and thus not shown nor described further in detail herein. Source air at supply pressure is supplied to a tractor front axle service reservoir 16 and a tractor rear axle service reservoir 17. Each service reservoir 16, 17 communicates supply pressure through lines 18, 19 to the front brake inlet 20 and rear brake inlet 21, respectively, of a dual application valve 23, a term broad enough to define a valve which not only includes known modified treadle valves but also known brake units having suspended brake pedals. Dual application valve 23 ports air at "signal" or "control" pressure for brake system purposes associated with such terms as known to those skilled in the art to the tractor's front brake actuators (not shown) through a line 26 and to the tractor's rear brake actuators (not shown) through a separate line 27. Signal pressure in lines 26, 27 at the outlets of dual application valve 23 are approximately equal and dual application valve is operable to effect braking of the tractor in the usual manner in that depressing valve 23 varying degrees admits air at corresponding signal pressures into the service brake chambers of the front and rear brake actuators via lines 26, 27, respectively, and release of valve 23 permits air flow to reverse its direction and vent through valve 23.

"T'd" to front brake line 26 is brake line 28 in fluid communication with a first inlet port 30 of double check valve 12. "T'd" to rear brake line 27 is a brake line 29 in fluid communication with a second inlet port 31 of double check valve 12. Outlet 32 of double check valve 12 is in fluid communication with a line 34.

Line 34 communicates with signal line inlet 36 of a tractor protector valve 38 and a supply line inlet 35 of tractor protector valve 38 is connected with a line 37 which is in fluid communication by a series of valves (not shown) to the source of compressed air 14 and is normally at supply pressure. Tractor protector valve 38 has a signal line outlet 40 for communicating air at signal pressure through line 42 to the trailer brake system. Tractor protector valve 38 also has a supply line outlet 41 for communicating air at supply pressure through line 43 to the trailer brake system. Tractor protector valve 38 is known in the art and will not be described in further detail herein other than to note that a spool valve within the housing is normally biased by air at supply pressure to provide fluid communication between signal line inlet and outlet 36, 40 and supply line inlet and outlet 35, 41. The spool within tractor protector valve 38 is sensitive to a predetermined drop in supply line pressure whereat the spool axially moves to prevent communication between its inlet and outlet ports thereby protecting the tractor brake system from the trailer brake system of the vehicle.

Double check valve 12 as shown includes a housing 50 having a centrally disposed open-ended bore 51 axially extending therethrough. One end 52 of bore 51 is in fluid communication with first inlet port 30 which is shown as a separate element threaded into housing 50 and sealed as at 53 with respect thereto. The opposite axial end 54 of bore 51 is similarly in fluid communication with second inlet port 31 which is likewise formed as a separate element threaded into housing 50 and sealed with respect thereto as at 55. Formed into housing 50 is outlet 32 which is in fluid communication with bore 51 and between ends 52, 54 thereof. Aligned with centerline 56 of outlet port 32 is a passage 58 formed in housing 50 which is made blind by a shortened bolt 59 threaded and sealed within the bottom of passage 58 from the exterior of housing 50. The open end of blind passage 58 is in fluid communication with bore 51. It is preferred that blind passage 58 be axially aligned with centerline 56 as shown in the drawing although it is only necessary to the working of valve 12 that blind passage 58 be perpendicular to bore 51.

Disposed at bore end 52 is a first circular seat 62 constructed of a known resilient synthetic elastomer. Likewise disposed at opposite bore end 54 is a second circular resilient valve seat 64. It is contemplated that valve seats 62, 64 could be metal and could be formed as integral parts of first and second inlet ports 30, 31.

Supported within an annular indentation 66 formed within each valve seat 62, 64 is a cylindrical cage member 67 which could either be a length of tubing or a flat piece of sheet metal blanked and formed into a cylinder. With cage member 67 thus disposed within bore 51, it should be clear that bore 51 is divided into a cylindrical area within cage member 67 communicating with first and second inlet ports 30, 31 and an annular area 68 at the outside of cage member 67 communicating with outlet 32 and blind passage 58. Unimpeded or unrestricted fluid communication between annular area 68 and the interior of cage member 67 is provided by a plurality of circumferentially spaced openings 70 cross-drilled or otherwise formed in cage member 67. The array of openings 70 is aligned with outlet centerline 56 and one of the openings 70a is positioned in registry with blind passage 58 and positively maintained in alignment therewith by the compression of resilient seats 62, 64 against the ends of cage member 67 brought about by threading first and second inlet ports 30, 31 into housing 50.

Disposed within cylindrical cage member 67 is a steel ball or spherical valve element 72 having a diameter slightly less than the internal diameter of cage member 67 and adapted when disposed at either bore end 52, 54 to uniformly seat against the resilient seat 62, 64 contacted. Spherical valve element 72 is normally maintained at one end of bore 51 by a spring biased detent ball mechanism shown to include a spring 74 seated at one end in blind passage 58 and contacting at its other end a detent ball 75 thereby tending to urge ball 75 out of aligned opening 70a. Aligned opening 70a is sized to permit detent ball 75 to extend within cage member 67 (but not more than halfway past opening 70a) and be in contact with spherical ball element 72 at all times of valve operation. More particularly, the sizing of spherical ball element 72, detent ball 75 and precompression force spring 74 is such that the horizontal component of the contact force exerted between detent ball 75 and spherical ball element 72 along a line between the centers 78, 79 of valve element 72 and detent ball 75, respectively, is a maximum when valve element 72 is seated against one of the valve seats 62, 64. That is, detent ball 75 exerts a maximum horizontal force against spherical valve element 72 when the valve element is seated against one of the seats and this force decreases as valve element 72 is disengaged from the previously contacted seat and axially shifts toward the other seat.

In operation, with dual application valve 23 unactuated, the air pressure in the tractor front and rear brake systems will be atmospheric. Air pressure at first and second inlet ports 30, 31 of double check valve 12 will likewise be atmospheric and spherical valve element 72 will be in contact with one of the two circular seats 62, 64 depending upon the position of valve element 72 at the last brake mode. Assuming valve element 72 to be in contact with circular seat 62 and maintained in sealing engagement therewith by the spring-biased detent mechanism, initial actuation of dual application valve 23 will simultaneously port air at signal pressure into lines 26, 28 and 27, 29. Pressure in these lines will instantaneously begin to build to the signal pressure at the outlets of dual application valve 23. Because first inlet port 30 of double check valve 12 is closed by valve element 72, pressure at inlet port 30 will, as a function of time, be equal to that admitted from the outlet of dual application valve 23. The pressure in second inlet port 31 of double check valve 12 will, however, build to a maximum value which will not equal signal line pressure at the outlet of dual application valve 23 because of, among other factors, the inherent resistance to flow in the length of the brake lines connected to double check valve 12. When the pressure in inlet 30 reaches a value which is greater than the pressure in second inlet 31 plus the compression force exerted by detent ball 75 against valve element 72, valve element 72 will roll into contact with seat 64. The signal pressure in inlet 30 will then begin to decrease while the signal pressure in second inlet 31 begins to increase until pressure levels are such that valve element 72 rolls back into contact with circular seat 62. In the event of failure of either the tractor front brake system or tractor rear brake system, air pressure in the failed system will significantly drop to permit signal pressure in the still active system to position valve element 72 against its proper seat thereby maintaining operation of the trailer brake system through tractor protector valve 38.

The ultimate effectiveness of any brake system is determined by the distance required to stop the vehicle at a given speed. Such tests are necessarily dependent upon the efficient function of all brake component parts of the entire vehicle. To determine the effectiveness of the brake system illustrated, by itself, regulations have been established which require that air pressure from the tractor system be delivered to the trailer brake system within a certain period of time. One such regulation requires that the operator fully depress dual application valve 23 thereby admitting service air at supply pressure into lines 26, 27 (approximately 120 psi) and that the time it takes to develop 60 psi pressure at a point immediately downstream of tractor protector valve 38 then be recorded.

When prior art double check valves were inserted into the system thus described and the system was tested in accordance with the above procedure, a time of approximately 0.130 second was required to develop 60 psi pressure at a point immediately downstream of tractor protector valve. It was further noted that the prior art check valves were in a constant state of oscillation between one or the other check valve inlets which oscillation in conjunction with the check valve design was believed responsible in providing pressure drops or resistance to the air flowing through the valve. In contrast, when the valve of the subject invention was inserted into the system described above, a response time of only 0.104 second was required to develop 60 psi downstream of the tractor protector valve, an improvement of almost 30 percent over the prior art. Furthermore, a significant decrease in oscillation of valve element 72 was observed. This decrease in oscillation resulted when double check valve 12 was designed with a spring 74 exerting a precompression force, as previously described, sufficient to require the pressure in the closed inlet to be 10–12 psi greater than the pressure in the open inlet. It is believed that check valve 12 would still function with significant results if the precompression force of spring 74 were reduced to a value which would require a pressure in the closed inlet port to be greater than the pressure in the open inlet port by at least 2 psi. This lower limit is believed attainable because the check valve design itself, the use of a spherical ball seat 72, the plurality of openings 70 and the annular area 68 permit unimpeded flow of air from the open inlet to outlet 32.

The invention has been described with reference to a preferred embodiment. Obviously, modifications and alterations will occur to others upon reading and understanding the specification. It is my intention to include all such modifications and alterations insofar as they come within the scope of the invention.

It is thus the essence of the invention to provide a double check valve for use in a tractor-trailer brake system whch utilizes a unique structure communicating the open inlet with the outlet in combination with a preset spring-biased ball detent mechanism to insure unimpeded flow of air through the check valve.

Having thus defined the invention, I claim:

1. In a pneumatic brake system for a tractor-trailer type vehicle including a source of compressed air; a dual application valve having an inlet port in fluid communication with said source, a first outlet in fluid communication with the front brakes of said tractor, a second outlet in fluid communication with the rear brakes of said tractor, said dual application valve being manually operable to admit service air at signal pressure into said first and second outlets, said service air being at approximately equal pressures in said first and second outlets; a first line in fluid communication with said first outlet and a second line in fluid communication with said second outlet of said dual application valve; a double check valve having a first inlet in fluid communication with said first line, a second inlet in fluid communication with said second line and an outlet; a tractor protector valve having a first inlet in fluid communication with said first outlet of said double check valve, a second inlet in fluid communication with said source of pressure, first and second outlets in fluid communication with the trailer brake system of said vehicle, said tractor protector valve normally communicating said first inlet with said first outlet and said second inlet with said second outlet and automatically responsive to a predetermined decrease in said supply pressure to prevent communication between said inlets and outlets thereof; said double check valve comprising:

a housing having a central bore axially extending therethrough, an outlet perpendicular to and in fluid communication with said bore and a blind passage opening to and perpendicular to said bore, said bore in fluid communication at one end with said first inlet and in fluid communication at its opposite end with said second inlet;

a circular valve seat at each end of said bore;

a spherical valve element in said bore;

cage means within said bore containing said sphere and permitting said sphere to roll into contact with either one of said circular seats, said cage means including a plurality of openings in an array axially aligned with said blind passage and said outlet, one of said openings aligned with said passage; and spring-biased ball detent means in said blind passage and extending through said aligned opening to maintain said sphere in sealing engagement with either one of said seats at any given time at a minimum contact force requiring air pressure at the sealed inlet to be at least 2 psi greater than air pressure at the open inlet to shift said sphere within said cage means.

2. The brake system of claim 1 wherein:

said cage means includes a member formed as a cylinder suspended within said bore to define an annular space therebetween, said annular space in fluid communication with said outlet.

3. The brake system of claim 2 wherein:

said detent means includes a spring within said blind passage and a spherical ball having a portion extending through said aligned hole, said ball being biased by said spring into said bore.

4. The brake system of claim 3 wherein:

said cage member and said spherical valve element are sized with respect to one another and with respect to the position of said detent ball to prevent said detent ball from extending more than half-way through said aligned opening.

5. The brake system of claim 4 wherein:

said contact force exerted by said detent ball on said valve element is preferably of a value which requires said air pressure in said sealed inlet to be 10 to 12 psi greater than said air pressure in the open inlet before said spherical valve element will shift to seal the other inlet.

6. A two-way check valve comprising a housing having a central bore extending therethrough;

an outlet extending through said housing in fluid communication with said bore and generally perpendicular thereto;

a blind passage in said housing in fluid communication with said bore at its open end and perpendicular to said bore;

a first inlet at one axial end of said bore and a second inlet at the opposite axial end of said bore;

a circular valve seat at each end of said bore;

a cylindrical cage member suspended within said bore and defining an annular space therebetween;

said cage member having a plurality of openings spaced circumferentially thereabout;

one of said openings in said cage member aligned with said blind passage;

a spherical ball valve member disposed within said cage member; and spring-biased ball detent means within said blind passage and extending from said aligned opening to exert the greatest force biasing said ball valve member into sealing engagement with one of said circular seats when said ball valve member is seated against said seat, said detent means including a spring disposed within said blind passage, and a spherical ball detent member biased by said spring to extend partially through said aligned opening to contact said ball valve member independent of the position of said ball valve member in said cage member, said detent ball and said ball valve member being spaced with respect to the force of said detent spring to permit said greatest force to occur when said ball valve member is seated against one of said seats.

7. The valve of claim 6 wherein:

each circular seat has an annular indentation formed therein; and each end of said cage member is received within one of said indentations whereby said cage member is suspended within said bore.

8. The valve of claim 7 wherein:

said circular seats are resilient; and said first and second inlets are threadedly received within said housing at the ends of said bore to maintain said circular seats compressed between said threaded inlets and the ends of said cage member thereby preventing said cage member from rotating within said bore.

* * * * *